Aug. 6, 1935.  F. J. SCHAFER  2,010,647
COMBINED AWNING AND SHUTTER
Filed July 2, 1929   2 Sheets—Sheet 1

Inventor:
Frank J. Schafer,
By his Attorneys:
Redding, Greeley, O'Shea & Campbell

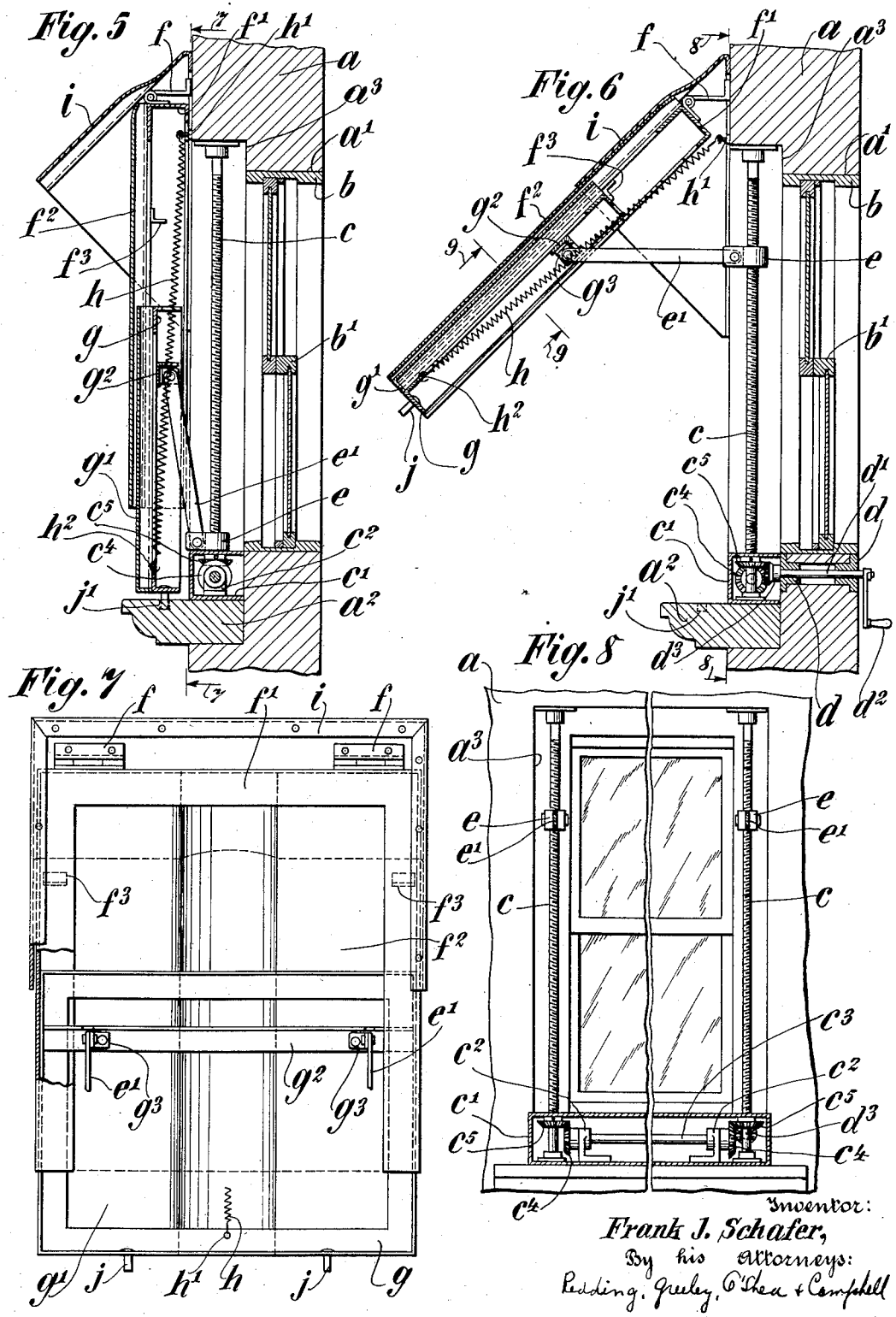

Patented Aug. 6, 1935

2,010,647

UNITED STATES PATENT OFFICE 2,010,647

COMBINED AWNING AND SHUTTER

Frank J. Schafer, Miami, Fla.

Application July 2, 1929, Serial No. 375,498

4 Claims. (Cl. 189—55)

The present invention relates to a combined awning and shutter construction and embodies, more specifically, an improved structure in which provision is made for closing the window opening effectively and easily, at the same time, the shutter elements being so mounted that they may be swung outwardly to form an awning for the window by a simple operation similar to that of the operating mechanisms now provided on many forms of awnings.

The desirability of providing an effective burglar-proof and fire-proof shutter for windows will be readily understood since many homes are occupied for considerable periods of time. At the same time, when occupied, awnings must be supplied for the windows. Several attempts have been made to provide a structure which combines the property of the awnings with those of a shutter but in none, now available, is there found the qualities which makes such constructions practicable and serviceable. They have either been too expensive and difficult to install or too complicated to be operated effectively, and the present constructions now available do not enjoy a very extensive use.

An object of the present invention, therefore, is to provide a combined awning and shutter which is simple in construction and operation, and inexpensive to install.

A further object of the invention is to provide a construction of the above character which is extremely rugged, as well as being fire-proof and adapted to be easily and quickly elevated into an awning, or retracted and locked over the window opening to form a shutter.

A further object of the invention is to provide a combined awning and shutter which is carried as a unit adjacent the window opening and may be adjusted in size to adapt it to serve as an awning, as well as a shutter.

Further objects, not specifically enumerated above, will be apparent as it is described in greater detail in connection with the accompanying drawings, wherein:

Figure 5 is a view in section, taken on line 5—5 of Figure 2, and looking in the direction of the arrows, showing the operating mechanism in greater detail.

Figure 6 is a view in section, taken on line 6—6 of Figure 4, and looking in the direction of the arrows.

Figure 7 is a view in section, taken on line 7—7 of Figure 5, and looking in the direction of the arrows.

Figure 8 is a view in section, taken on line 8—8 of Figure 6, and looking in the direction of the arrows.

Referring to the above drawings, $a$ designates the wall of a building having a window opening $a'$. A window frame $b$ and sashes $b'$ are mounted in the window opening and the usual window sill $a^2$ is provided.

Exteriorly of the window, and in a recess $a^3$ usually provided in a window, threaded rods $c$ are mounted. A rectangular frame $c'$, secured to the sill $a^2$, journals the lower ends of shafts $c$ and is provided with brackets $c^2$ within which a shaft $c^3$ is journaled. Shaft $c^3$ is provided with bevel pinions $c^4$ which engage bevel gears $c^5$ on the shafts $c$.

Extending through the wall $a$, and journaled in bearings $d$, is a shaft $d'$. A manually operable crank $d^2$ is secured to one end of the shaft $d'$ and a bevel pinion $d^3$ is secured to the other end of the shaft $d'$, this pinion engaging a bevel gear $c^5$ on one of the shafts $c$.

The shafts $c$ are oppositely threaded and carry blocks $e$ which have hingedly secured thereto, links $e'$. Upon turning the crank $d^2$ in opposite directions, the blocks $e$ may be either raised or lowered, as desired.

Figure 9:
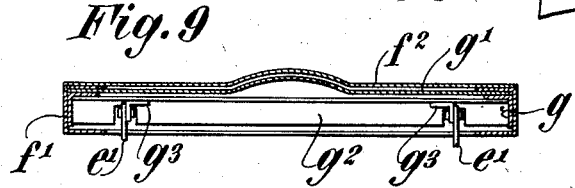
Figure 9 is a view in section, taken on line 9—9 of Figure 6, and looking in the direction of the arrows.

Adjacent the top of the recess $a^3$, and exteriorly of the wall $a$, a bracket $f$ is secured. This bracket hingedly carries a U-shaped upper frame $f'$, over the upper flanges of which a cover plate $f^2$ is secured. The U-shaped frame $f'$ is provided with a U-shaped cross section and receives, telescopically, a lower rectangular frame $g$ which is preferably formed of angle irons of L-shaped cross section, as shown in Figure 9. A cover plate $g'$ is secured to the upper flanges of the angle irons and serves, in effect, as a continuation of the cover plate $f^2$ when the lower section is in extended position.

Stops $f^3$ are secured on the inner face of the cover plate $f^2$ and limit the telescoping movement of the lower section $g$. A cross piece $g^2$ is secured to the frame $g$ and carries brackets $g^3$ to which the outer ends of links $e'$ are hinged. A spring $h$ is secured to the top of the recesses $a^3$ at $h'$ and to the lower cross piece of the frame $g$ at $h^2$, thus normally tending to telescope the frame sections. A water shed $i$ is secured to the wall over the hinge $f$ and upper portion of the frame $f'$ to render the construction more weathertight and inaccessible.

Figure 1:
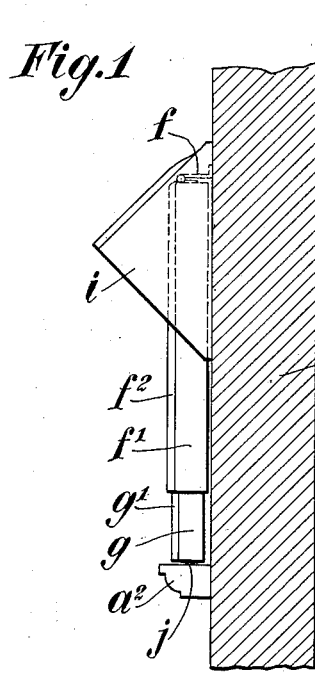
Figure 1 shows a combined awning and shutter constructed in accordance with the present invention and used as a shutter.
Figure 2:
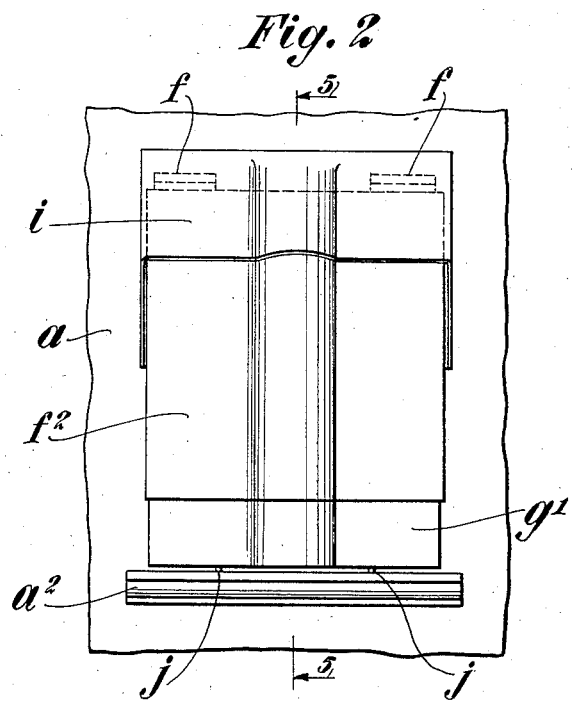
Figure 2 is a view in front elevation, showing the shutter of Figure 1.
Figure 3:
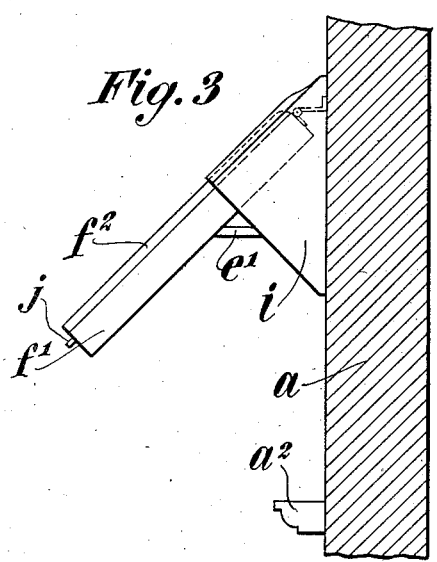
Figure 3 is a view in side elevation of the construction shown in Figure 1, the shutter being elevated and reduced in size to serve as an awning.
Figure 4:
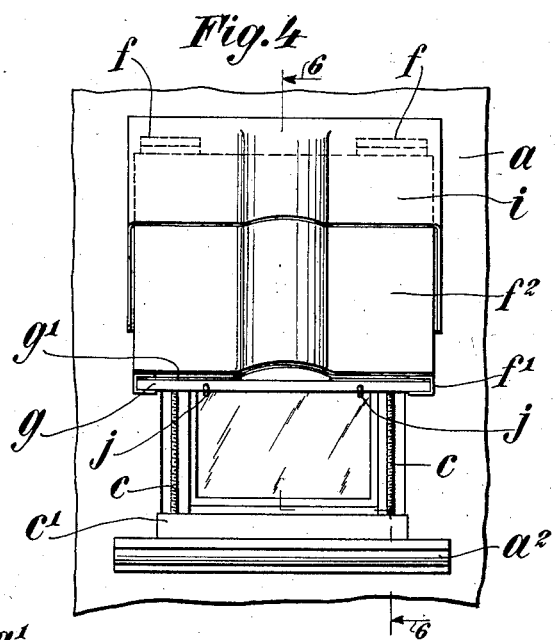
Figure 4 is a view in front elevation of the shutter in the position shown in Figure 3.

Pins $j$ are carried by the lower cross member of the rectangular frame $g$ and are received in recesses $j'$ in the sill $a^2$. When the shutter is in the position shown in Figures 1, 2, and 5, the lower frame $g$ is extended and pins $j$ engage the recesses $j'$ to lock the shutter in a closed position. From the exterior, the window opening is quite inaccessible and a highly effective and strong shutter is provided. Upon turning the crank $d^2$ in the proper direction, the blocks $e$ are elevated to telescope the frame $g$ within the frame $f'$ until the upper portion of the frame $g$ strikes stops $f^3$. Further movement of the blocks $e$ upwardly elevates the upper section $f'$ and swings it outwardly to the position shown in Figure 6. In such position, the hinged member which is now the size of the upper frame $f'$, serves as an awning and the exterior thereof may be decorated in a suitable fashion.

Upon rotation of the cranks $d^2$ in the opposite direction, blocks $e$ are lowered, and the upper section $f'$ is retracted into a normal vertical position. After reaching such position, further downward movement of blocks $e$ extends frame $g$ and moves it into the position shown in Figure 5 to lock the frames in a closed position.

While the invention has been described in connection with the specific constructions shown in the accompanying drawings, it is not to be limited, save as defined in the appended claims.

I claim as my invention:

1. A device of the character described comprising a channelled member hinged adjacent an opening in a building structure, a second member slidably carried in the first member, cover plates for the members, means connected to the second member to move the same with respect to the first and to move the first upon its hinge and means on the second member for engaging the bottom of the opening to lock the members in an extended position in the opening.

2. A device of the character described comprising a member hinged adjacent an opening in a building structure, threaded rods journaled in the window openings, means to rotate the rods, blocks carried by the rods, a second member slidably carried by the first, links connecting the blocks to the second member, and a spring normally tending to telescope the members.

3. A device of the character described comprising a member hinged adjacent an opening in a building structure, a second member slidably carried by the first member, locking means on the second member, and common means to move the first member upon its hinge into a plane parallel with the window and subsequently extend the second member to close the window opening fully, the last part of the last named motion serving to lock the locking means on the second member.

4. The combination with a window frame providing a window opening, of a combined awning and shutter comprising a screen member hingedly mounted above the opening, an auxiliary screen member slidably carried by said first named screen member, means movably connecting the auxiliary screen member with the window frame, and means for moving said auxiliary screen member with respect to the hingedly mounted screen member whereby both of said screen members may be swung downwardly for closing the window opening.

FRANK J. SCHAFER.